H. E. HUGHES.
MACHINE FOR SAWING BEVELS.
No. 37,816.
PATENTED MAR. 3, 1863.
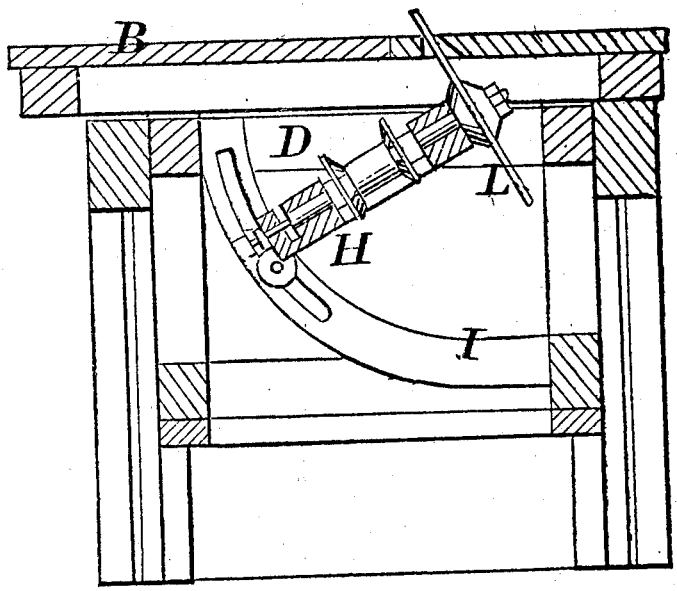
TAKEN FROM PATENT OFFICE REPORT
1863 VOL. II
ONLY DRAWING ACCESSIBLE (1911)

UNITED STATES PATENT OFFICE.

HUTSON E. HUGHES, OF CINCINNATI, OHIO.

IMPROVED MACHINE FOR SAWING BEVELS.

Specification forming part of Letters Patent No. 37,816, dated March 3, 1863.

*To all whom it may concern:*

Be it known that I, HUTSON E. HUGHES, of Cincinnati, in the county of Hamilton, in the State of Ohio, have invented a new and Improved Machine for Sawing Bevels; and I do hereby declare that the following is a full and exact description thereof, reference being had to the accompanying drawings, and to the letters of reference marked thereon.

The nature of my invention consists in hanging circular saws in such a manner that they can be set at any angle to the face of the table, so as to saw any bevel with accuracy.

To enable others skilled in the art to make and use my invention, I will proceed to describe its construction and operation, referring direct to the accompanying drawings.

Figure 1 shows a perspective view. Figure 2 is a cross-section through the center of the arbor K and frames A and D. Fig. 3 is a plan of the saw-arbor and frame D.

Like letters of reference refer to like parts.

A A, Figs. 1 and 2, is the main frame, and is of the ordinary construction. B is the table or cover, having grooves at N N, which fit upon corresponding guides upon frame A, for the purpose of guiding the table B transversely across the frame A. D is a frame working vertically in guides at Q Q, Figs. 1 and 2, to which the arbor-frame H and quadrant I are attached. The frame D is raised and lowered by the inclines or wedges O O O, Figs. 1 and 2. The saw C is of the ordinary construction, secured upon arbor K, said arbor working in boxes P P, Figs. 1, 2, and 3, which are a part of frame H. This frame is supported at the end adjoining the saw on bearings M M, Figs. 1 and 3, on frame D, by which it is free to have motion up or down, and as the saw moves with it the different angles are thus produced in relation with the table B, which has a transverse motion and is free to follow the saw, as the opening through the table at L, Fig. 2, is enlarged on the under side, so as to permit the clearance of the saw as it is moved in the various positions. The quadrant I has a slot, *u*, Fig. 2, through which a set-screw, J, passes. The screw is secured in frame H at the opposite end from the saw. By means of this bolt and quadrant the frame H and saw C are secured in any position desired. The driving-pulleys G and F are of the ordinary construction, and from which motion is communicated to the saw by the belt E.

In order to put this machine in operation, it is only necessary to move the frame H until the saw attains the proper angle with the table B, then tighten the set-screw J, which secures the arbor-frame H with the quadrant I. If it is desired to saw a groove or rabbet, the frame D is raised or lowered, as the necessity of the case requires, by means of the inclines O O O, Figs. 1 and 2, upon which the frame D rests. After the table B is moved to its proper position, it is secured to the frame A by any of the well-known devices.

What I claim, and desire to secure by Letters Patent, is—

1. The arrangement of the movable arbor-frame H, supported in bearings at one end and adjustable at the other, in the manner and for the purpose set forth.

2. The movable table B, with the beveled slot L, when it has a transverse motion in relation to the saw, for the purpose herein described.

3. The combination of the movable arbor-frame H with the quadrant I and transverse moving table B and vertical sliding frame D, substantially as and for the purpose set forth.

H. E. HUGHES.

Witnesses:
 DAVID FISHER,
 JAMES A. HUGHES.